(12) United States Patent
Yildirim (10) Patent No.: US 12,330,568 B2
(45) Date of Patent: Jun. 17, 2025

(54) METAL BAND AS INLAY FOR EDGE-PROTECTION STRIPS AND METHOD FOR PRODUCTION OF SAID METAL BAND

(71) Applicant: BFC FAHRZEUGTEILE GMBH, Bietigheim-Bissingen (DE)

(72) Inventor: Ali Yildirim, Waiblingen (DE)

(73) Assignee: BFC FAHRZEUGTEILE GMBH, Bietigheim-Bissingen (DE)

( * ) Notice: Subject to any disclaimer, the term of this patent is extended or adjusted under 35 U.S.C. 154(b) by 347 days.

(21) Appl. No.: 17/795,774

(22) PCT Filed: Jan. 27, 2021

(86) PCT No.: PCT/EP2021/051889
§ 371 (c)(1),
(2) Date: Jul. 27, 2022

(87) PCT Pub. No.: WO2021/151962
PCT Pub. Date: Aug. 5, 2021

(65) Prior Publication Data
US 2023/0001865 A1    Jan. 5, 2023

(30) Foreign Application Priority Data
Jan. 28, 2020 (DE) .................... 10 2020 101 975.0

(51) Int. Cl.
*B60R 13/04* (2006.01)
*B21D 28/24* (2006.01)

(52) U.S. Cl.
CPC ............ *B60R 13/04* (2013.01); *B21D 28/243* (2013.01)

(58) Field of Classification Search
None
See application file for complete search history.

(56) References Cited

U.S. PATENT DOCUMENTS

| 3,519,281 A | 7/1970 | Teucher et al. |
| 4,333,221 A | 6/1982 | Hayashi |
| 2004/0150171 A1 | 8/2004 | Bonds |
| 2010/0212230 A1 | 8/2010 | Ogilvie |
| 2010/0239826 A1 | 9/2010 | Hiroe |
| 2018/0345772 A1 | 12/2018 | Tessier et al. |
| 2019/0136979 A1 | 5/2019 | Gellrich et al. |

FOREIGN PATENT DOCUMENTS

| CN | 108290484 A | 7/2018 |
| CN | 109070712 A | 12/2018 |
| DE | 1248397 B | 8/1967 |

(Continued)

OTHER PUBLICATIONS

International Search Report (English and German) and Written Opinion of the ISA (German) issued in PCT/EP2021/051889, mailed May 11, 2021; ISA/EP.

(Continued)

*Primary Examiner* — Xiaobei Wang (57) ABSTRACT

A metal band as an insert for trim strips, sealing strips, or edge protection strips, in particular for motor vehicles, wherein the surface is profiled at at least one flat side of the band to increase the adhesion between the metal band and a plastic or rubber coating. These metal bands can also be designed with a plurality of openings following one another in the longitudinal direction of the band, in particular cut and roll-stretched or punched slots.

27 Claims, 5 Drawing Sheets

(56) References Cited

FOREIGN PATENT DOCUMENTS

| | | |
|---|---:|---|
| DE | 3020447 A1 | 12/1980 |
| DE | 4105367 C2 | 6/1993 |
| DE | 29620673 U1 | 3/1998 |
| DE | 102015120415 A1 | 6/2017 |
| DE | 102018004379 A1 | 12/2019 |
| JP | 2011143918 A | 7/2011 |
| WO | WO-2014175566 A1 | 10/2014 |
| WO | WO-2015139996 A1 | 9/2015 |

OTHER PUBLICATIONS

Search Report of the German Patent and Trademark Office issued in DE 10 2020 101 975.0, dated Nov. 4, 2020.
German International Preliminary Report on Patentability issued in PCT/EP2021/051889, mailed Dec. 6, 2021.
Office Action issued in corresponding Chinese Patent Application 202180011324.3 dated Jun. 17, 2024.

Fig.4

METAL BAND AS INLAY FOR EDGE-PROTECTION STRIPS AND METHOD FOR PRODUCTION OF SAID METAL BAND

CROSS-REFERENCE TO RELATED APPLICATIONS

This application is a U.S. National Phase Application under 35 U.S.C. 371 of International Application No. PCT/EP2021/051889, filed on Jan. 27, 2021, which claims the benefit of German Patent Application No. 10 2020 101 975.0, filed on Jan. 28, 2020. The entire disclosures of the above applications are incorporated herein by reference.

BACKGROUND

This section provides background information related to the present disclosure which is not necessarily prior art.

Technical Field

The present invention relates to a metal band as an insert for trim strips, sealing strips, or edge protection strips, in particular for motor vehicles.

Discussion

A metal band is known from JP 2011 143918 A. Furthermore, metal bands as an insert for edge protection strips are also known from DE 10 2018 004379 A1, US 2004/150171 A1, and DE 30 20 447 A1.

Such metal bands are in particular used in the automotive sector as inserts for sealing strips for sealing off engine compartment openings, trunk openings, and for door and window openings. The continuously produced metal bands are jacketed by a sealing material, such as rubber and/or a flexible plastic, and often have slots, among other things, in order to enable a penetration of the sealing material in the case of metal bands not coated with an adhesive agent since an adhesion between rubber and metal or between plastic and metal is not possible or is insufficient. On the other hand, metal bands coated with an adhesive agent are very expensive. Apart from slots, which can in particular be produced by a rotary cutting, such metal bands can also have punched openings. Cut slots can be widened by roller stretching. However, metal bands without openings can also be used, in particular if the finished sealing strips have large radii of curvature in the installed state. These metal bands generally require an adhesive coating.

Before or after the jacketing with the sealing material, metal bands of said kind are bent into a clamping profile that is usually of U shape and that is clamped onto the sealing flanges of the opening. In order in this respect to be able to follow the contours of the opening, the clamping profile should be flexible in both perpendicular directions to its longitudinal direction. Furthermore, the clamping profile should be compressible in its longitudinal direction if the openings to be sealed have peripheral tolerances since a cutting to length of the sealing strip on site would be very complex.

On the other hand, the clamping profile also has to have a specific tensile strength and stiffness since the trim strips, sealing strips, or edge protection strips are typically manufactured by extrusion, wherein considerable forces occur in the longitudinal direction of the band. A further requirement of the clamping profile comprises exerting as large as possible a clamping force onto the sealing flanges.

Known clamping profiles are provided with openings or toothed arrangements for the following reasons: on the one hand, these toothed arrangements or openings are necessary in the case of non-coated metal bands in order to obtain a connection of the rubber or plastic through the metal band since rubber and plastic does not adhere or adheres poorly to bare metals and the metal band would therefore lie loosely in the sealing profile. The rubber or plastic therefore penetrates the openings or teeth and thus anchors the metal band in the sealing profile. On the other hand, teeth or openings are required in the metal band to be able to bend the sealing profile around radii of the respective opening, trunk, hood, or door.

However, the intermediate toothed spaces, which can have an opening width of 0.5 to 1.5 mm and more, result in an undesirable "hungry horse" effect at the finished profile, i.e. a very unattractive, rough, or wavy surface which one attempts to conceal with various measures, for example by flocking, covering with textiles, covering with additional lips, trim strips, or by applying various knurlings. These measures are time-consuming and cost-intensive as well as usually weight-increasing and are not always possible such as, for example, in outwardly disposed door shaft seals or outer roof moldings at motor vehicles. Therefore, one is forced to turn to surface-coated metal bands to whose surface rubber or plastics adhere and which can be provided with very small intermediate toothed spaces of just over 0.0 mm to <0.4 mm in order to avoid a "hungry horse" effect and to obtain very beautiful, smooth surfaces at the finished profile. However, such coated bands are very expensive and have relatively long delivery times. Furthermore, there are only a few manufacturers for said coating materials.

There are indeed also metallic clamping profiles that do not a require a concealment for optical reasons. However, coated metal bands are also required here, in particular if these bands have a wide central web or a plurality of wide webs since otherwise the clamping profile lies loosely embedded in the rubber or plastic in the region of the web and deformations occur at the finished profile on the bending of the profile around radii of openings or the like.

SUMMARY

This section provides a general summary of the disclosure, and is not a comprehensive disclosure of its full scope or all of its features.

It is the underlying object of the invention to avoid said disadvantages. A metal band should in particular be specified that manages without a coating and nevertheless enables a good adhesion between the plastic or rubber, on the one hand, and the metal band, on the other hand.

This object is satisfied in that the surface is profiled at at least one flat side of the band.

Due to the profiling of at least one flat side of the metal band, the surface of the band increases. An adhesion between the plastic or rubber and the metal band can thereby be improved. Furthermore, the profiled structure of the respective surface also leads to a better adhesive connection between the plastic or rubber, on the one hand, and the metal band, on the other hand.

The metal band in accordance with the invention has significantly lower costs with respect to known bands, in particular coated bands. Furthermore, bands in accordance with the invention are easier to manufacture so that they can be supplied without problems. Finally, due to the profiling, a partial material consolidation and thus an increase in the strength of the band can also result.

The band preferably has a plurality of openings following one another in the longitudinal direction of the band, in particular slot-like openings. The openings of the band enable a better flexibility of the metal band, whereby the metal band or the trim strip, sealing strip, or edge protection strip produced therefrom can be better adapted to the margin of the opening.

To increase the adhesive effect of the rubber material or of the plastic material at the metal band, the profiling of the surface at at least one flat side of the band is, in accordance with the invention, formed by a surface-enlarging grid pattern of a plurality of impressions. Due to the increased surface, the metal band has more attachment surface for the sealing material, whereby it can be connected more firmly to the metal band.

Surface-enlarging means that the surface of the metal band profiled by means of a plurality of impressions has a larger surface than the unprofiled surface of the metal band. The surface enlargement is achieved in that the sheet material is stretched by a cold deformation to produce the impressions, whereby the surface of the embossed metal band ultimately increases compared to the unembossed metal band.

For a particularly strong adhesion between the metal band and the sealing material, it is advantageous if the profiling covers an area at least regionally.

To provide one or both flat sides of a metal band in accordance with the invention with a profiling, the metal band can preferably be provided with a plurality of impressions.

The surface of the respective flat side of the metal band can be regionally or completely provided with a profiling. The surface can in particular be provided with a profiling in one or more longitudinal strips. For example, the profiling can be provided in the regions with openings or in regions without openings. The provision of a profiling in regions without openings has the advantage that where no plastic or rubber material can penetrate the metal band, a good adhesion between the plastic or rubber, on the one hand, and the metal band, on the other hand, can nevertheless be achieved.

The profiling of the surface at the respective flat side of the metal band can preferably have a pattern that repeats in the longitudinal direction and/or transverse direction of the band. On the one hand, a uniformly good adhesion over the band is hereby achieved and, on the other hand, such a pattern is easy to manufacture.

The adhesion between the metal band and the sealing material is preferably achieved by a plurality of individual impressions arranged closely next to one another. In this respect, the profiling can have a density of up to 700 impressions, preferably up to 800 impressions, and particularly preferably of up to 850 impressions, on an area of one square centimeter. In other words, the surface of the metal band has a profiling with up to 700 embossments per square centimeter, preferably with up to 800 embossments per square centimeter, and particularly preferably with up to 850 embossments per square centimeter.

The embossing depth of the impressions can be continuously settable from 0.01 mm to 0.7 mm so that the impressions can have an embossing depth of 0.01 mm to 0.7 mm. The embossing depth can, for example, be continuously set by a contact pressure of a tool used for the embossing, such as an embossing die or an embossing roller. In this respect, it applies that the higher the contact pressure is, the greater the embossing depth is. The resulting surface increase due to the impressions is the greater, the greater the embossing depth is, in particular since the material of the metal band is stretched more by a greater embossing depth.

In accordance with a possible embodiment, at least one impression can have a longitudinal extent, wherein the longitudinal extent of the impressions is oriented at an angle of 0° to 90° with respect to the longitudinal direction of the band. Due to the orientation of longitudinally extending impressions, an increased adhesion of the sealing material to the metal band can be achieved in a preferred direction.

Alternatively or additionally, at least one impression can so-to-say be designed point-shaped. Due to a so-to-say point-shaped design of the impressions, as many impressions as possible can be produced per unit of area.

In accordance with particular embodiments of the invention, the impressions have the shape of a three-sided or four-sided pyramid or of such a truncated pyramid, the shape of a cone or truncated cone, the shape of a dome, a cylinder, a hipped roof, or a lens. Combinations of these shapes are also possible. Furthermore, free-form shapes are also possible for the impressions. The anchoring of the rubber or plastic to the metal band can hereby be improved in an advantageous manner so that a coating of the metal band can be dispensed with.

In accordance with an embodiment that can be realized as simply and thus as inexpensively as possible, a plurality of impressions can be arranged in consecutive rows and columns. In this respect, the rows of impressions can extend in the longitudinal direction, i.e. in parallel with the longitudinal direction of the band, and the columns can extend in the transverse direction, i.e. in parallel with the transverse direction of the band. The surface of the metal band can hereby be produced by an embossing roller oriented transversely, in particular at a right angle, to the longitudinal direction of the band in a rolling embossing process. However, it is also possible for the rows of impressions to be oriented obliquely, i.e. at an angle different from 0°, such as 45°, with respect to the longitudinal direction of the band. In a corresponding manner, the columns of impressions can be oriented obliquely, i.e. at an angle different from 0°, such as 45°, with respect to the transverse direction of the band.

So that the surface is profiled as efficiently as possible, i.e. as densely as possible, with impressions, the impressions of columns of impressions following one another in the longitudinal direction of the band can be offset from one another in the transverse direction. As dense as possible an arrangement of the impressions can preferably be achieved in that the impressions of columns of impressions following one another in the longitudinal direction of the band are offset from one another by half the longitudinal extent of an impression.

The spacing between the centers of an impression and a directly adjacent impression, viewed in the transverse direction of the band, is preferably less than 1.0 mm, preferably less than 0.7 mm, and particularly preferably less than 0.4 mm. Additionally or alternatively, the spacing between the centers of an impression and a directly adjacent impression, viewed in the longitudinal direction of the band, is less than 0.7 mm, preferably less than 0.5 mm, and particularly preferably less than 0.3 mm. Due to such small spacings between adjacent impressions, as many surface-increasing impressions as possible can be realized per unit of area.

A particularly high adhesion of the sealing material can be achieved in that both flat sides of the band have impressions. Alternatively, however, also only one flat side of the band can have impressions, whereby the metal band can be manufactured particularly easily and inexpensively.

A profiling at both sides of the band surface can, for example, be achieved in that each flat side of the band is profiled by means of an embossing roller. In this respect, the metal band is guided between two embossing rollers.

In accordance with the invention, a flat side is provided with impressions such that in each case no stamped portion results at the oppositely disposed flat side.

The metal band preferably consists of steel, in particular of stainless steel, or of aluminum. This material has proved to be advantageous for said purposes of use.

A material thickness of the metal band between 0.25 mm and 1 mm has likewise proved to be advantageous for said purposes of use. A range for the material thickness of 0.4 mm to 0.8 mm is particularly preferred.

The invention also relates to a trim strip, a sealing strip, or an edge protection strip comprising a metal band of the type described above, wherein a sealing material at least regionally surrounding the band is applied intimately connected to the surface of the band at least in the region of the profiling.

The metal band of the type described above preferably serves for the use as an insert in a trim strip, a sealing strip, or an edge protection strip.

The invention is also directed to a method of manufacturing a metal band of the type described above. The method comprises the following steps:
providing a band-like metal sheet,
profiling, in particular embossing, the surface of at least one flat side of the metal sheet, in particular to produce a plurality of impressions, and
preferably producing consecutive openings, in particular by means of punching and/or cutting the metal sheet,
if necessary, preferably elongating the metal sheet to increase the opening width of at least some of the openings by stretching the metal sheet.

The profiling of the surface of the flat side can take place both before and after the production of the openings. However, a particularly good profiling is achieved if the profiling of the band surface takes place after the production of the openings since the shape and the embossing depth are then not influenced by the production of the openings, in particular not by the elongation of the metal sheet.

As already mentioned, the surface of the flat side can be profiled in a rolling embossing process by means of at least one embossing roller. For this purpose, a jacket surface of the embossing roller can have a shape that is designed complementary to the shape of the impressions to be embossed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Embodiments of the invention are shown in the drawing and will be described in the following. There are shown, in a schematic representation in each case, FIG. 1 a plan view of a narrow side of a metal band in accordance with the invention.

DETAILED DESCRIPTION

Example embodiments will now be described more fully with reference to the accompanying drawings.

In the drawings, the Figures show views of different metal bands that are used as an insert in a trim strip, a sealing strip, or an edge protection strip.

Figure 1:
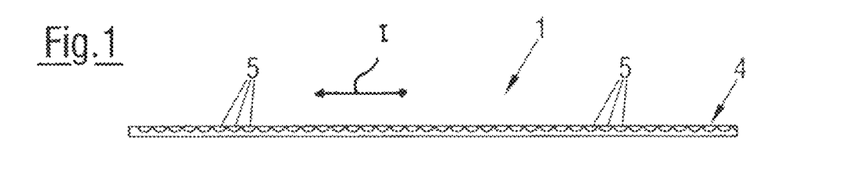
Figure 2:
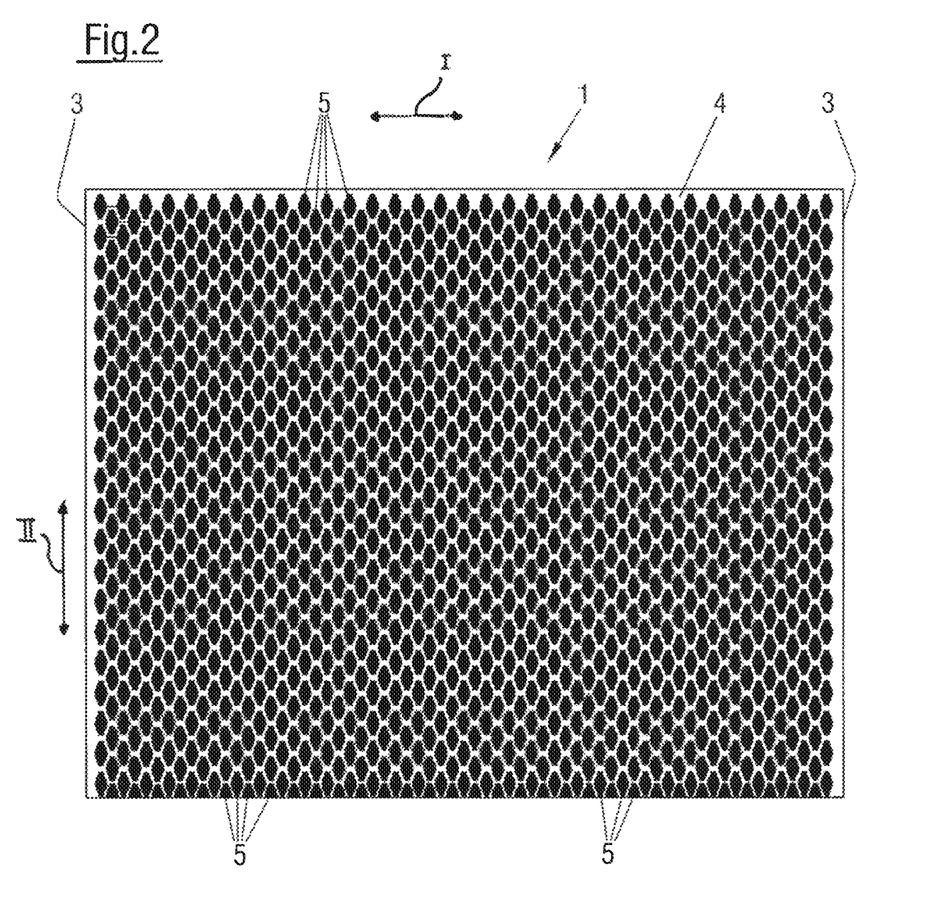
FIG. 2 a plan view of a flat side of the metal band of FIG. 1.

The metal band 1 shown in FIGS. 1 and 2 has no slots or openings. However, as can in particular be seen in FIG. 2, the surface of the shown flat side 4 of the metal band 1 is profiled. The flat side 4 is in particular provided with a plurality of impressions 5 that are arranged uniformly distributed over the total surface of this flat side 4. In this respect, the flat side 4 is provided with impressions 5 such that in each case no stamped portion results at the oppositely disposed flat side 4.

Moreover, it is also possible that both flat sides 4 of the band 1 have impressions.

Due to the impressions 5, a profiling in the form of a surface-enlarging grid pattern of a plurality of impressions 5 is formed at the correspondingly profiled flat side 4 of the band 1.

So that a sealing material, such as a rubber material or a flexible plastic material, can adhere particularly well to the metal band 1, as many individual impressions 5 as possible are arranged closely next to one another. The profiling can in this respect have a density of up to 700 impressions 5, preferably up to 800 impressions 5, and particularly preferably of up to 850 impressions 5, on an area of one square centimeter. In the embodiment shown, 833 impressions per square centimeter are provided.

Between the surface of the flat side 4 and a base of an impression 5, the impression 5 can have an embossing depth of 0.01 mm to 0.7 mm.

As can be seen from FIGS. 2 to 6, the impressions 5 have a longitudinal extent. The longitudinal extent of the impressions 5 is oriented at an angle of at least approximately 90° with respect to the longitudinal direction I of the band 1 or, in other words, the longitudinal extent of the impressions 5 is aligned at least approximately in parallel with the transverse direction II of the band 1. However, the impressions 5 can also be oriented with their respective longitudinal extent at another angle different from 90° with respect to the longitudinal direction I of the band 1.

As can likewise be seen from FIGS. 2 to 6, a plurality of impressions 5 are arranged in consecutive rows and columns, wherein the rows extend in the longitudinal direction I of the band 1 and the columns extend in the transverse direction II of the band 1. The plurality of impressions 5 are each arranged behind one another in a column in the longitudinal direction I of the band 1, wherein the columns of the impressions 5 are oriented transversely to the longitudinal direction I of the band 1 in accordance with the longitudinal extent of the impressions 5. In other words, the columns of impressions 5 arranged behind one another are aligned at least approximately in parallel with the transverse direction II of the band 1. It can further be seen from FIGS. 2 to 6 that the impressions 5 of columns of impressions 5 following one another in the longitudinal direction I of the band 1 are offset from one another in the transverse direction II. More specifically, the impressions 5 of columns of impressions 5 following one another in the longitudinal direction of the band are offset from one another by half the longitudinal extent of an impression 5. The impressions 5 in this respect form a pattern that repeats both in the longitudinal direction I and in the transverse direction II of the metal band 1.

For a particularly dense arrangement of the impressions 5, the spacing between the centers of an impression 5 and a directly adjacent impression 5 in the transverse direction II of the band 1 can be less than 1.0 mm and preferably less than 0.7 mm. In the embodiments, the spacing between two impressions 5 in the transverse direction II of the band 1 is less than 0.4 mm.

Additionally or alternatively, the spacing between the centers of an impression 5 and a directly adjacent impression 5, viewed in the longitudinal direction I of the band 1, can be less than 0.7 mm and preferably less than 0.5 mm. In the embodiments, the spacing between two adjacent impressions 5, viewed in the longitudinal direction I of the band 1, is less than 0.3 mm. Since the columns of impressions 5 follow one another in longitudinal directions, the spacing between two columns of impressions 5 is consequently likewise less than 0.3 mm.

The second flat side of the metal band 1 can be profiled or smooth in a corresponding manner. A good adhesion between the metal band and the plastic jacket thereby results even without an adhesive coating and without openings.

The impressions 5 can also have no longitudinal extent, but can so-to-say be designed point-shaped. In this respect, the impressions 5 can have the shape of a three-sided or four-sided pyramid or truncated pyramid, a cone or truncated cone, a dome, a cylinder, a hipped roof, a lens, transverse grooves or longitudinal grooves, and a free-form shape or combinations thereof. The metal band preferably consists of stainless steel or aluminum and has a material thickness between 0.25 mm and 1 mm. The material thickness preferably amounts to 0.4 to 0.8 mm.

Figure 3:
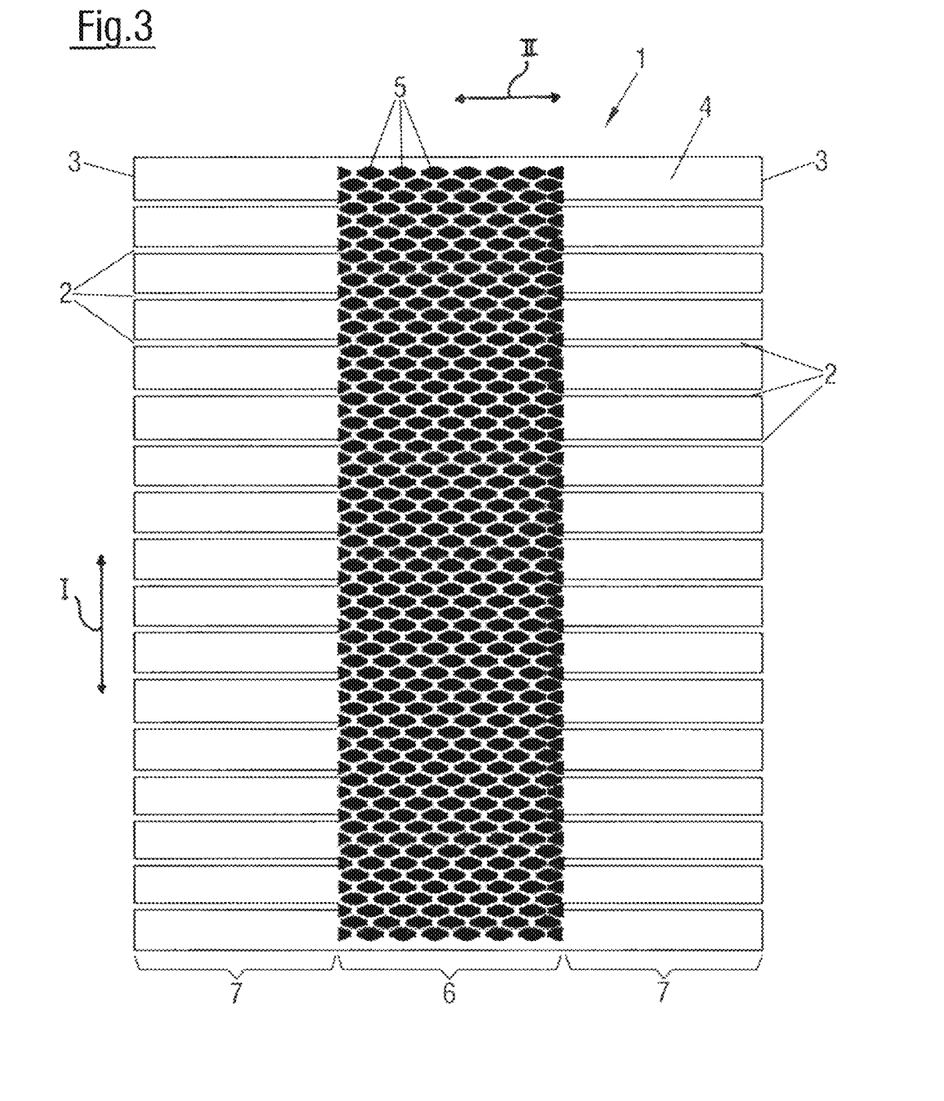
FIG. 3 a plan view of a flat side of another variant of the metal band in accordance with the invention.

The embodiment of FIG. 3 agrees in principle with the embodiment of FIGS. 1 and 2. In contrast to the embodiment of FIGS. 1 and 2, the impressions 5 are here, however, only present in a central region 6, viewed over the transverse direction II of the metal band 1. In this central region 6, the metal band 1 has no openings. The marginal regions 7 disposed at both sides from the central region 6 are, in contrast, provided with slots 2 that are guided inwardly from a margin 3 of the metal band 1. In this respect, the band 1 has a plurality of slot-like openings 2 that follow one another in the longitudinal direction I of the band 1. As mentioned, no impressions 5 are present in these two marginal regions 7; the surface of the metal band 1 is therefore not profiled in these regions.

Figure 4:
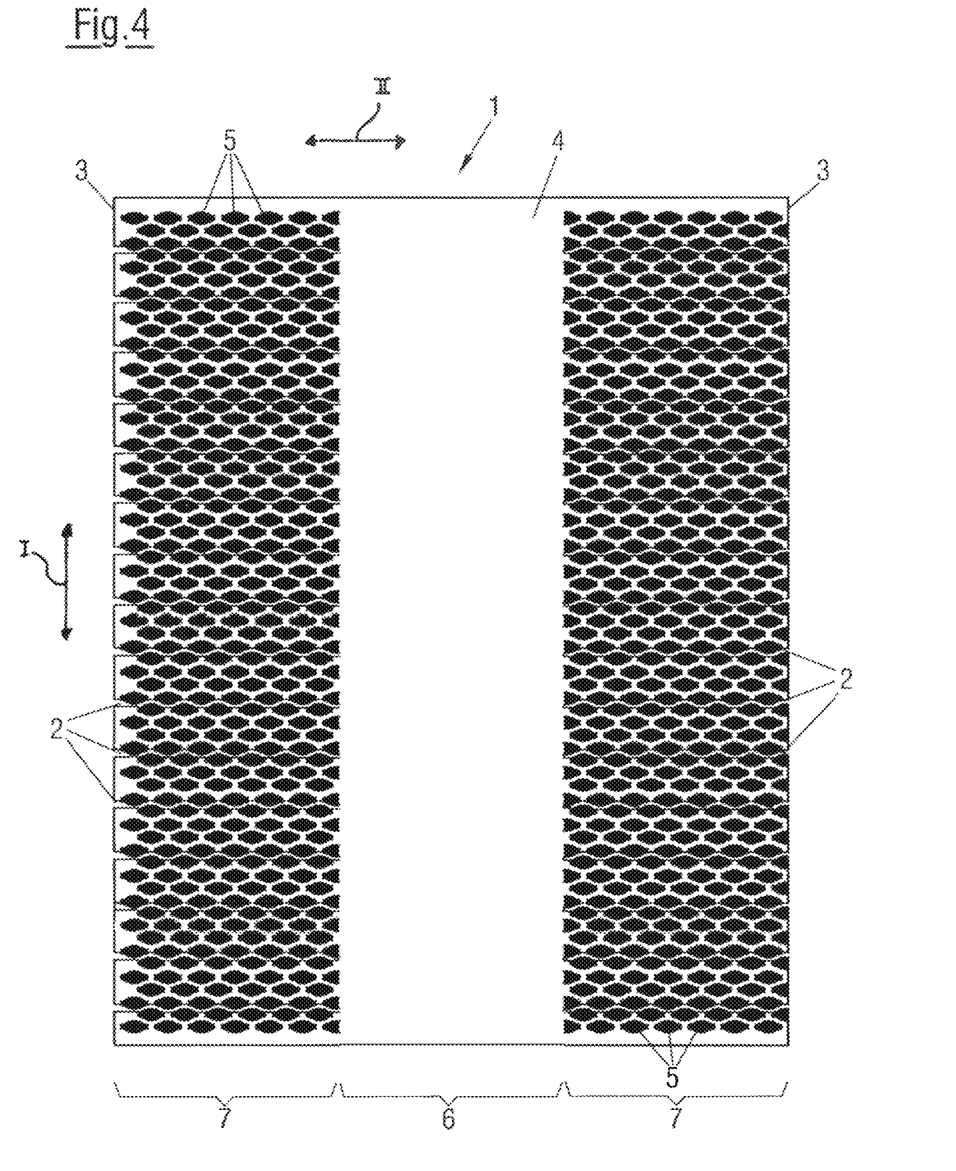
FIG. 4 a plan view of a flat side of yet another variant of a metal band in accordance with the invention.

The embodiment of FIG. 4 in turn largely agrees with the embodiment of FIG. 3. In contrast to the embodiment of FIG. 3, however, the impressions 5 are here only provided in the two marginal regions 7, while no profiling of the surface of the metal band 1 is present in the central region 6.

Figure 5:
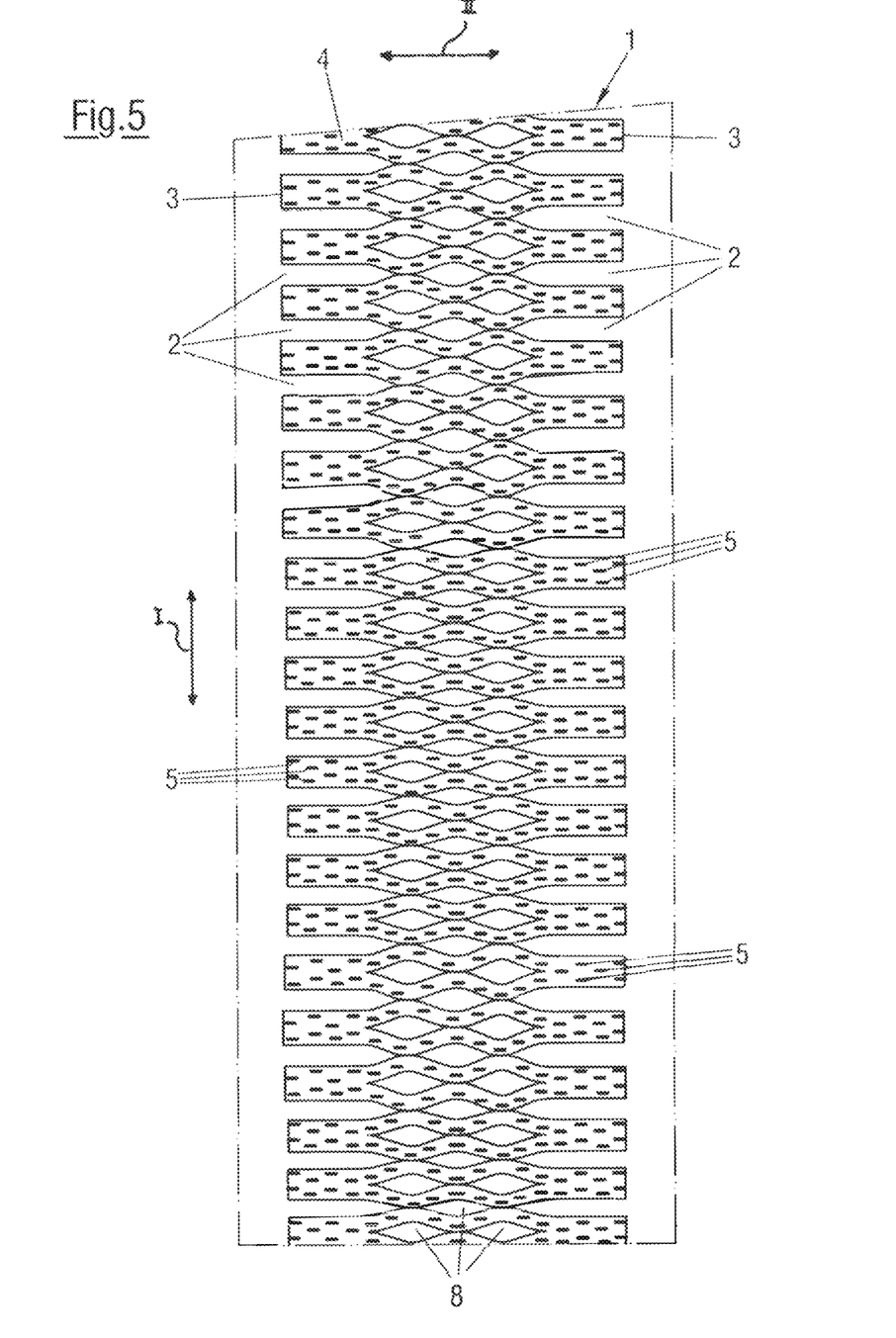
FIG. 5 a plan view of a flat side of a further variant of the metal band in accordance with the invention.

In the metal band of the embodiment of FIG. 5, in addition to the openings 2, which are designed as slots guided inwardly from the two margins 3, isolated openings 8 are also present in the central region 6 of the metal band. Like the marginal slots 2, the isolated openings 8 are provided following one another in the longitudinal direction I of the band, wherein three tracks of isolated openings 8 are present that overlap one another. The total surface of the shown flat side 4 of the metal band 1 is profiled in that impressions 5 are formed in this flat side 4. The oppositely disposed flat side of the metal band can likewise be provided with such or other impressions as a profiling.

Figure 6:
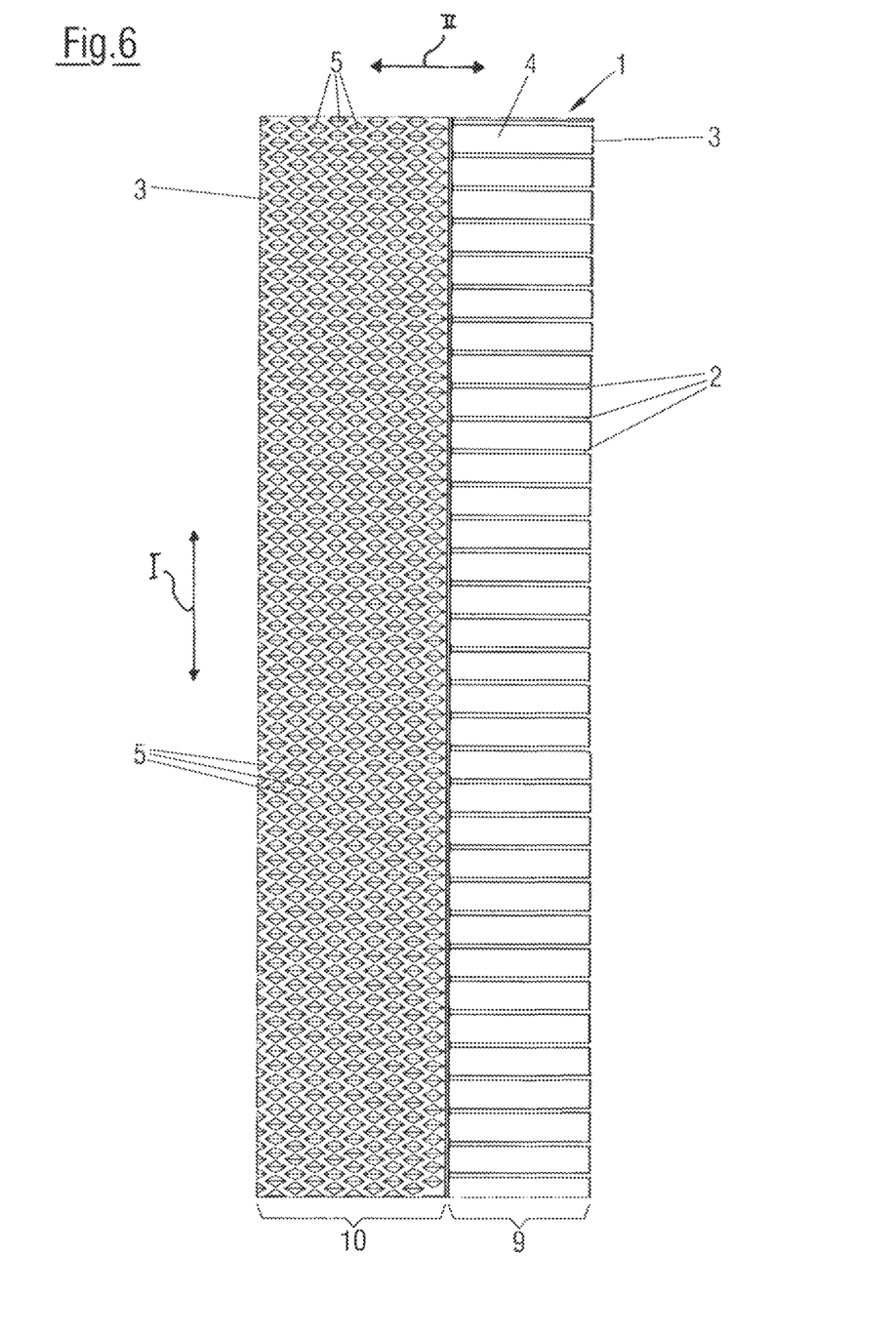
FIG. 6 another plan view of a flat side of a metal band in accordance with the invention.

FIG. 6 shows an embodiment of the metal band 1 in accordance with the invention with an asymmetrical design. Openings 2 are only provided in a region 9 that is extended from a margin 3 of the metal band up to close to its center. No openings are present in the remaining region 10 of the metal band that extends from the other margin 3 of the metal band up to the first region 9. On the other hand, the second region 10 is provided with a profiled surface in that impressions 5 are present in the flat side 4 shown, while no profiling is provided in the first region 9. The profiling is also formed as a repeating pattern here and can also be present at the oppositely disposed flat side of the metal band in this form or another form.

All the metal bands shown preferably consist of steel, in particular of stainless steel, or aluminum and have a material thickness of preferably between 0.25 mm and 1 mm, in particular between 0.4 mm and 0.8 mm. The impressions 5 of the metal bands shown can each have the shape that was described for the embodiment of FIG. 1. Unlike what is shown, the impressions 5 also cannot follow a pattern, but can be arranged randomly distributed over the surface of the respective flat side 4. The distribution of the profiling to different regions of the metal band 1 can also be selected differently.

The metal band in accordance with the invention is characterized by good adhesive properties with plastic or rubber. It can therefore be used without a surface coating for trim strips, sealing strips, or edge protection strips, in particular for motor vehicles. The metal bands shown are preferably bent into a U profile and each form a clamping profile.

A method of manufacturing a metal band is explained below. The method starts with the provision of a band-like metal sheet. Subsequently, consecutive openings 2, 8 are produced in the metal band, for example, by punching and/or cutting the metal sheet. The metal sheet can, if necessary, be pulled apart to increase the opening width of at least some of the openings 2, 8 by stretching the metal sheet. In a subsequent step, the surface of the flat side 4 or both surfaces of the flat side 4 are profiled, in particular embossed, to produce a plurality of impressions 5. Alternatively, the profiling of the surface of the flat side 4 or the surfaces of the flat sides 4 can also take place before the production of the openings 2, 8.

The profiling of the surface of the or each flat side 4 in this respect takes place in a rolling embossing process by means of at least one embossing roller. For this purpose, the embossing roller has a jacket surface that has a shape designed complementary to the shape of the impressions 5 to be embossed.

Subsequently, the metal band is at least regionally surrounded by means of a sealing material, such as a rubber material or a flexible plastic material, in order to form a trim strip, a sealing strip, or an edge protection strip with a metal band inserted therein in which the sealing material at least regionally surrounds the band 1 and in which the sealing material is applied intimately connected to the surface of the band in the region of the profiling.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A metal band as an insert for trim strips, sealing strips, or edge protection strips, wherein a surface of the metal band has a profiling at at least one flat side of the band,
wherein the profiling of the surface at at least one flat side of the band is formed by a surface-enlarging grid pattern of a plurality of impressions that are formed such that in each case no stamped portion results at the oppositely disposed flat side.

2. The metal band in accordance with claim 1, wherein the band has a plurality of openings following one another in the longitudinal direction of the band.

3. The metal band in accordance with claim 1, wherein the profiling covers an area at least regionally.

4. The metal band in accordance with claim 1, wherein the surface of the flat side is only regionally provided with the profiling.

5. The metal band in accordance with claim 1, wherein the profiling is only provided in regions with openings.

6. The metal band in accordance with claim 1, wherein the profiling is only provided in regions without openings.

7. The metal band in accordance with claim 1, wherein the total surface of the flat side is profiled.

8. The metal band in accordance with claim 1, wherein the profiling has a pattern that repeats in the longitudinal direction and/or the transverse direction of the band.

9. The metal band in accordance with claim 1, further comprising a plurality of individual impressions arranged closely next to one another.

10. The metal band in accordance with claim 1, wherein the profiling has a density of up to 700 impressions on an area of one square centimeter.

11. The metal band in accordance with claim 1, wherein the impressions have an embossing depth of 0.01 mm to 0.7 mm.

12. The metal band in accordance with claim 1, wherein the band has a greater thickness in a region of the profiling than in a region without a profiling.

13. The metal band in accordance with claim 1, wherein the impressions have a longitudinal extent, with the longitudinal extent of the impressions being oriented at an angle of 0° to 90° to the longitudinal direction of the band.

14. The metal band in accordance with claim 1, wherein the impressions are point-shaped.

15. The metal band in accordance with claim 1, wherein the impressions have the shape of a three-sided or four-sided pyramid or truncated pyramid, a cone or truncated cone, a dome, a cylinder, a hipped roof, a lens, or a free-form shape.

16. The metal band in accordance with claim 1, wherein a plurality of impressions are arranged in consecutive rows and columns.

17. The metal band in accordance with claim 16, wherein the impressions arranged in columns includes a first column of impressions and a second column of impressions following one another in the longitudinal direction of the band and the impressions of the first column and the impressions of the second column are offset from one another in the transverse direction.

18. The metal band in accordance with claim 2, wherein the spacing between the centers of an impression and a directly adjacent impression, viewed in the transverse direction of the band, is less than 1.0 mm.

19. The metal band in accordance with claim 2, wherein the spacing between the centers of an impression and a directly adjacent impression, viewed in the longitudinal direction of the band, is less than 0.7 mm.

20. The metal band in accordance with claim 1, wherein both flat sides of the band have impressions.

21. The metal band in accordance with claim 1, wherein the metal band consists of steel.

22. The metal band in accordance with claim 1, wherein the metal band has a material thickness of 0.25 mm to 1 mm.

23. A trim strip, a sealing strip, or an edge protection strip comprising a metal band, wherein the metal band has a surface that has a profiling at at least one flat side of the band, wherein the profiling of the surface at at least one flat side of the band is formed by a surface-enlarging grid pattern of a plurality of impressions that are formed such that in each case no stamped portion results at the oppositely disposed flat side, and wherein a sealing material at least regionally surrounding the band is applied intimately connected to the surface of the band at least in the region of the profiling.

24. A method of using the metal band of claim 1, comprising:
inserting the metal band into a sealing material to form a trim strip, a sealing strip, or an edge protection strip.

25. A method of manufacturing a metal band, wherein a surface of the metal band has a profiling at at least one flat side of the band,
wherein the profiling of the surface at at least one flat side of the band is formed by a surface-enlarging grid pattern of a plurality of impressions that are formed such that in each case no stamped portion results at the oppositely disposed flat side, wherein the method comprises the following steps:
providing a band-like metal sheet, and
profiling the surface of at least one flat side of the metal sheet.

26. The method in accordance with claim 25, further comprising producing openings in the band-like metal sheet, wherein the profiling of the surface of the flat side takes place before or after the production of openings in the band-like metal sheet.

27. The method in accordance with claim 25, wherein the surface of the flat side is profiled in a rolling embossing process by means of at least one embossing roller.

* * * * *